(12) United States Patent
Keller et al.

(10) Patent No.: US 11,332,246 B2
(45) Date of Patent: May 17, 2022

(54) CONTAINER RETENTION AND RELEASE APPARATUS FOR USE WITH AIRCRAFT

(71) Applicant: The Boeing Company, Chicago, IL (US)

(72) Inventors: Cory Gordon Keller, St. Charles, MO (US); James V. Eveker, St. Louis, MO (US)

(*) Notice: Subject to any disclaimer, the term of this patent is extended or adjusted under 35 U.S.C. 154(b) by 695 days.

(21) Appl. No.: 16/200,238

(22) Filed: Nov. 26, 2018

(65) Prior Publication Data

US 2020/0164982 A1 May 28, 2020

(51) Int. Cl.
*B64D 1/02* (2006.01)
*F16B 2/10* (2006.01)

(52) U.S. Cl.
CPC . *B64D 1/02* (2013.01); *F16B 2/10* (2013.01)

(58) Field of Classification Search
CPC ... B64D 1/00; B64D 1/02; B64D 1/04; B64D 1/06; F16B 2/10
See application file for complete search history.

(56) References Cited

U.S. PATENT DOCUMENTS

| | | | |
|---|---|---|---|
| 2,386,680 A | 10/1945 | Grotke | |
| 2,413,635 A | 12/1946 | Lee | |
| 2,478,019 A | 8/1949 | Sonntag | |
| 2,877,688 A | 3/1959 | Markil | |
| 2,941,442 A | 6/1960 | Buschers | |
| 2,978,211 A | 4/1961 | Wannlund et al. | |
| 3,181,908 A | 5/1965 | Clark | |
| 3,242,808 A * | 3/1966 | Pault | B64D 1/04 89/1.51 |
| 3,268,188 A | 8/1966 | La Roe et al. | |
| 3,367,233 A | 2/1968 | Silverschotz | |
| 3,670,620 A | 6/1972 | Paraskewik | |
| 3,787,012 A | 1/1974 | Jakubowski, Jr. | |
| 3,877,343 A * | 4/1975 | Newell | F41F 5/00 89/1.51 |
| 3,887,150 A | 6/1975 | Jakubowski, Jr. | |
| 4,120,232 A | 10/1978 | Hoffman, Jr. | |
| 4,122,754 A | 10/1978 | Panlqui et al. | |
| 4,132,147 A | 1/1979 | Contaldo | |
| 4,168,047 A | 9/1979 | Hasquenoph et al. | |
| 4,187,760 A | 2/1980 | Holt | |
| 4,196,879 A * | 4/1980 | Craigie | B64D 7/08 244/137.4 |
| 4,202,576 A * | 5/1980 | Hasquenoph | B64D 7/08 244/137.4 |
| 4,204,456 A * | 5/1980 | Ward | B64D 7/08 294/205 |
| 4,257,639 A | 3/1981 | Stock | |
| 4,318,561 A * | 3/1982 | Hasquenoph | B64D 7/08 244/137.4 |

(Continued)

FOREIGN PATENT DOCUMENTS

GB 784053 A * 10/1957 ............... B64D 1/06

*Primary Examiner* — Benjamin P Lee
(74) *Attorney, Agent, or Firm* — Hanley, Flight & Zimmerman, LLC (57) ABSTRACT

Container retention and release apparatus are disclosed. An example container retention and release apparatus includes an actuator, a swaybrace coupled to the actuator, and a clamp pivotally coupled to the swaybrace. The clamp pivots between a clamping position to retain a container and a release position to release a container.

19 Claims, 9 Drawing Sheets

(56) References Cited

U.S. PATENT DOCUMENTS

| | | | |
|---|---|---|---|
| 4,407,180 A | 10/1983 | Regnat | |
| 4,441,674 A | 4/1984 | Holtrop | |
| 4,620,680 A | 11/1986 | Hasquenoph et al. | |
| 4,732,074 A * | 3/1988 | Normand | B64D 1/06 89/1.51 |
| 4,850,533 A | 7/1989 | Hoshi et al. | |
| 4,850,553 A * | 7/1989 | Takata | B64D 1/06 244/137.4 |
| 5,052,639 A * | 10/1991 | Lemacon | B64D 1/06 244/137.4 |
| 5,335,881 A * | 8/1994 | Zaguli | B23Q 7/043 244/171.9 |
| 5,406,876 A | 4/1995 | Harless et al. | |
| 5,484,243 A | 1/1996 | Yacobovitch | |
| 5,904,323 A | 5/1999 | Jakubowski, Jr. et al. | |
| 6,811,123 B1 | 11/2004 | Foster et al. | |
| 7,083,148 B2 * | 8/2006 | Bajuyo | B64D 1/04 244/137.4 |
| 7,648,104 B1 | 1/2010 | Jakubowski, Jr. et al. | |
| 7,677,501 B1 | 3/2010 | Hundley et al. | |
| 7,946,208 B1 | 5/2011 | Howard et al. | |
| 10,336,543 B1 | 7/2019 | Sills et al. | |
| 10,518,883 B2 * | 12/2019 | Lewendon | F41F 5/00 |
| 10,858,102 B2 | 12/2020 | Keller et al. | |
| 2006/0006288 A1 | 1/2006 | Jakubowski, Jr. et al. | |
| 2006/0108478 A1 * | 5/2006 | Bajuyo | B64D 1/04 244/137.4 |
| 2017/0197716 A1 | 7/2017 | Taylor et al. | |
| 2018/0281952 A1 * | 10/2018 | Lewendon | B64D 1/06 |
| 2019/0200534 A1 | 7/2019 | Hawkins | |
| 2020/0164983 A1 * | 5/2020 | Keller | B64D 1/02 |
| 2020/0164984 A1 | 5/2020 | Keller et al. | |
| 2020/0391866 A1 * | 12/2020 | Keller | B64D 1/06 |
| 2021/0163126 A1 | 6/2021 | Gray et al. | |

* cited by examiner

CONTAINER RETENTION AND RELEASE APPARATUS FOR USE WITH AIRCRAFT

FIELD OF THE DISCLOSURE

This disclosure relates generally to aircraft and, more particularly, to container retention and release apparatus for use with aircraft.

BACKGROUND

When suspending disposable containers (e.g., a weapon, a payload, a cargo container, etc.) from aircraft, it is desirable to provide suitable chocks or swaybraces to steady the containers while carrying the containers in flight to the point at which the container is released. Military aircraft that are used to dispense bombs, rockets, and other stores in flight usually include racks located beneath the wings and/or fuselage, or in weapon bays designed to release the stores upon command. Commercial aircraft that are used to dispense containers in flight usually include a retention and/or release system located beneath the fuselage (e.g., a belly of the fuselage).

SUMMARY

In some examples, a container retention and release apparatus includes an actuator, a swaybrace coupled to the actuator, and a clamp pivotally coupled to the swaybrace. The clamp is to pivot between a clamping position to retain a container and a release position to release the container.

In some examples, a container retention and release apparatus includes a cylinder including a piston movably coupled to the cylinder, a swaybrace coupled to a first end of the piston, the swaybrace having a first leg and a second leg, and a clamp pivotally coupled to the swaybrace. The clamp includes a first arm pivotally coupled to the first leg of the swaybrace via a first pivot; and a second arm pivotally coupled to the second leg of the swaybrace via a second pivot, the first arm and the second arm to pivot in a first direction about the respective first and second pivots to retain the container, and the first arm and the second arm to pivot in a second direction opposite the first direction to release the container.

In some examples, a method includes: moving an actuator between a first stroke position and a second stroke position, the actuator supporting a swaybrace; retaining the container by pivoting a first arm of a clamp relative to a first leg of the swaybrace and pivoting a second arm of the clamp relative to a second leg of the swaybrace in a first direction when the actuator is in the first stroke position; and releasing the container by pivoting the first arm relative to a first leg and pivoting the second arm relative to the second leg in a second direction opposite the first direction when the actuator is in the second stroke position.

Certain examples are shown in the above-identified figures and described in detail below. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Containers (e.g., stores, weapons, missiles, etc.) can be attached to and released from an aircraft. Containers can be used to carry munitions or other material (e.g., bombs, rockets, missiles, rations, etc.) to be dropped from the aircraft upon command. To carry and dispense containers upon command, aircraft often employ container retention and release apparatus (e.g., bomb racks) located beneath the wings and/or fuselage.

However, when coupled beneath the wings and/or fuselage, containers (e.g., missiles) can be exposed to many sources of mechanical vibration that can affect system reliability, safety, and mission effectiveness. One of the most significant exposures to vibration occurs when a missile is being carried by an aircraft (e.g., a military aircraft, a helicopter) or other aviation platform, which is a condition known as captive carry.

Some known container ejector apparatus employ hooks and/or other retention apparatus to hold the container in captive carry flight. Additional structural contact points within the container are often needed for swaybraces and/or retainers to constrain the container in captive carry flight. For example, the containers typically include protruding lugs, hangers, and/or other fasteners that provide the container attachment points which couple with the swaybraces and/or other retainers to constrain the container. However, the protruding lugs, hangers, and/or other retention contact points result in aerodynamic drag on the container (e.g., missile) after release of the container from the host aircraft while in free flight of the container that reduces container performance (e.g., a flight range of a missile). The separate lugs/hangers and/or swaybrace contact points add structural weight to the container and reduce available volume for payload within the container. To engage a hook mechanism of a conventional container retention and release apparatus, a container is accurately positioned or aligned (e.g., vertically) relative to the container retention and release apparatus. Some containers (e.g., weapons) include foldable lugs to mitigate the aerodynamic and/or detectability penalty due to protruding lugs or hangers. However, the use of foldable lugs results in loss of internal volume in a container, increased weight of the container, increased difficulty of loading the container on an aircraft, and/or can cause additional difficulties for a container loading crew. Additionally, most conventional container retention and release apparatus do not control roll and/or yaw of a container during ejection of the container. Some known container ejector apparatus incorporate a constrained container release system that reduces container yaw during ejection. However, there may be a need to improve the ejector apparatus and enhance effective departure of the container (e.g., to improve accuracy of an intended trajectory).

Example container retention and release apparatus (e.g., a bomb rack) disclosed herein retain and release a captively carried container in-flight. To retain and release a container, example container retention and release apparatus disclosed herein employ an example retention apparatus (e.g., a clamping apparatus) to interface with an outer mold line (OML) of a container (e.g., a store, a weapon, etc.). Thus, example retention apparatus disclosed herein eliminate the need to provide protruding lugs, hangers, and/or attach points that would otherwise protrude from an outer surface of a container. In this manner, the container retention and release apparatus disclosed herein enable a container to have a smooth aerodynamic surface (e.g., a smooth outer surface) without external and/or internal protrusions such as lugs, hangers, or receptacles affecting aerodynamic characteristic(s) of the container. Additionally, the retention apparatus and a swaybrace contacts the container only at the swaybrace contact points and the retention apparatus contact points eliminating the need for additional frames in the container for lugs or hangers, thereby reducing container weight and increasing internal volume available for payload. Further, the container retention and release apparatus disclosed herein are extendable to facilitate loading of a container with the retention apparatus. In some examples, example retention apparatus disclosed herein can be manually extended to aid with positioning a container during a loading operation.

Example container retention and release apparatus disclosed herein include a swaybrace that is fixed to, or integrally formed with, an actuator (e.g., an actuation member such as a piston, a diaphragm, etc.) and a retention apparatus having clamp arms (e.g., a claw) pivotally coupled to the swaybrace. To eliminate clamp deflections due to captive carry flight loads, example clamps disclosed herein including clamping arms pivotally coupled to the swaybrace. In some examples, to provide a clamping force and/or a preload to the clamping arms, example clamp apparatus disclosed herein include preload retainers (e.g., a screw, a fastener, a clamp, etc.) that can be adjusted to vary (e.g., increase or decrease) a preload force on the container. During a captive carry flight condition, pivotal movement of the example clamp arms are restrained by an actuator cylinder housing a piston.

Figure 1A:
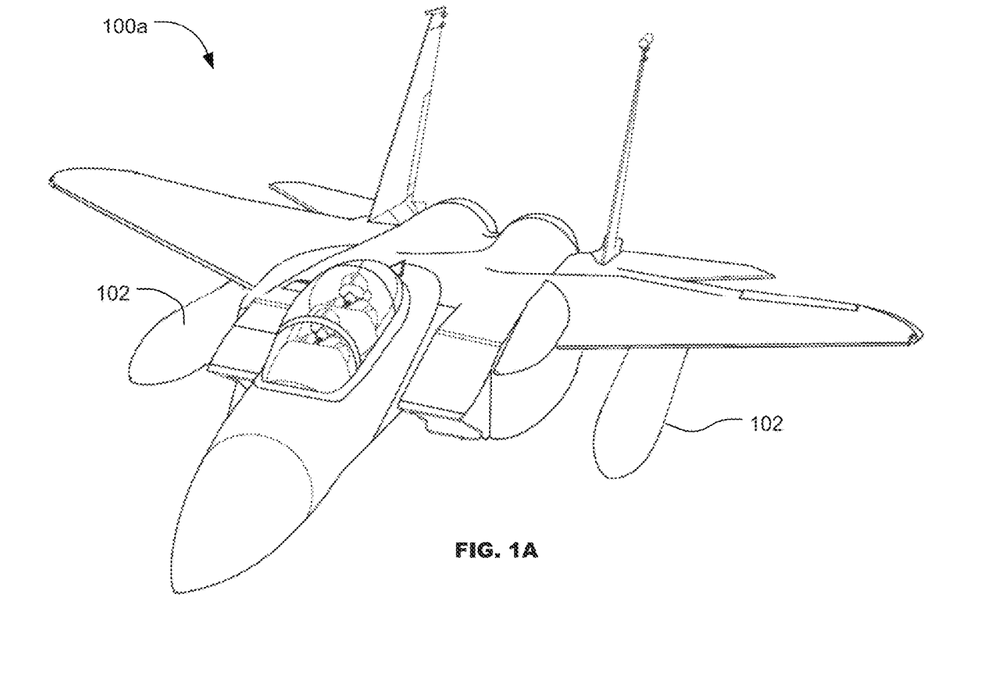
FIG. 1A is a perspective view of an example aircraft that can be implemented with an example container retention and release apparatus disclosed herein.
Figure 1B:
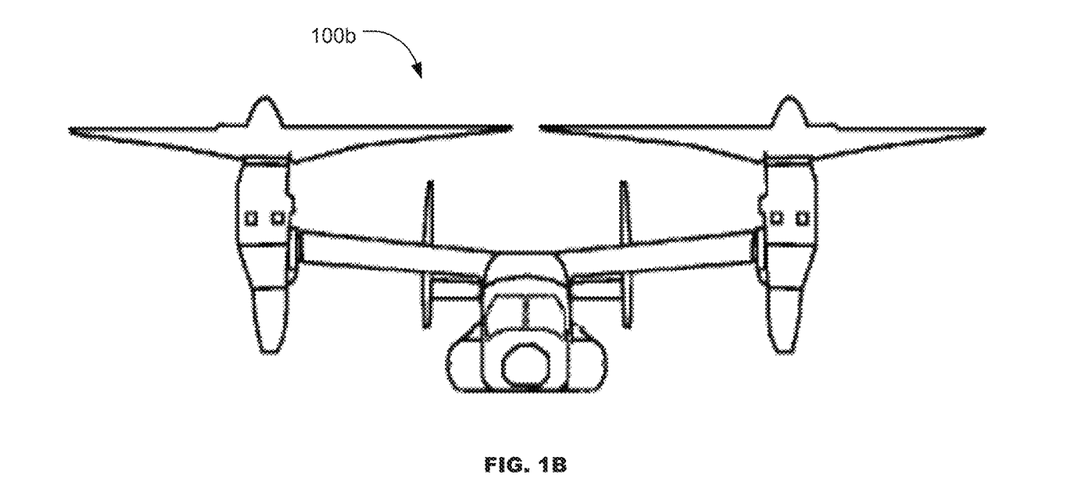
FIG. 1B is a front view of an example commercial aircraft that can be implemented with an example container retention and release apparatus disclosed herein.

FIG. 1A is an aircraft 100a that can be implemented with an example container retention and release apparatus constructed in accordance with teachings of this disclosure. For example, the aircraft 100a of FIG. 1A can implement the example container retention and release apparatus disclosed herein that retains and/or releases a container 102 (e.g., a store, a weapon, a missile, etc.) of the aircraft 100a of FIG. 1A. The example teachings disclosed herein are not limited to the aircraft 100a of FIG. 1A. FIG. 1B is another aircraft 100b that can implement example container retention and release apparatus disclosed herein. For example, the aircraft 100b of FIG. 1B is a commercial aircraft that can be used to deliver pods and/or other cargo. In some examples, the aircraft 100b of FIG. 1B can be an autonomous aircraft such as, for example, an unmanned aerial vehicle (i.e., a drone). In some examples, the container retention and release apparatus disclosed herein can be implemented with other types of aircraft such as, for example, vertical takeoff and landing aircraft, military aircraft, helicopters, drones, commercial aircraft, and/or any other type of aircraft.

Figure 2A:
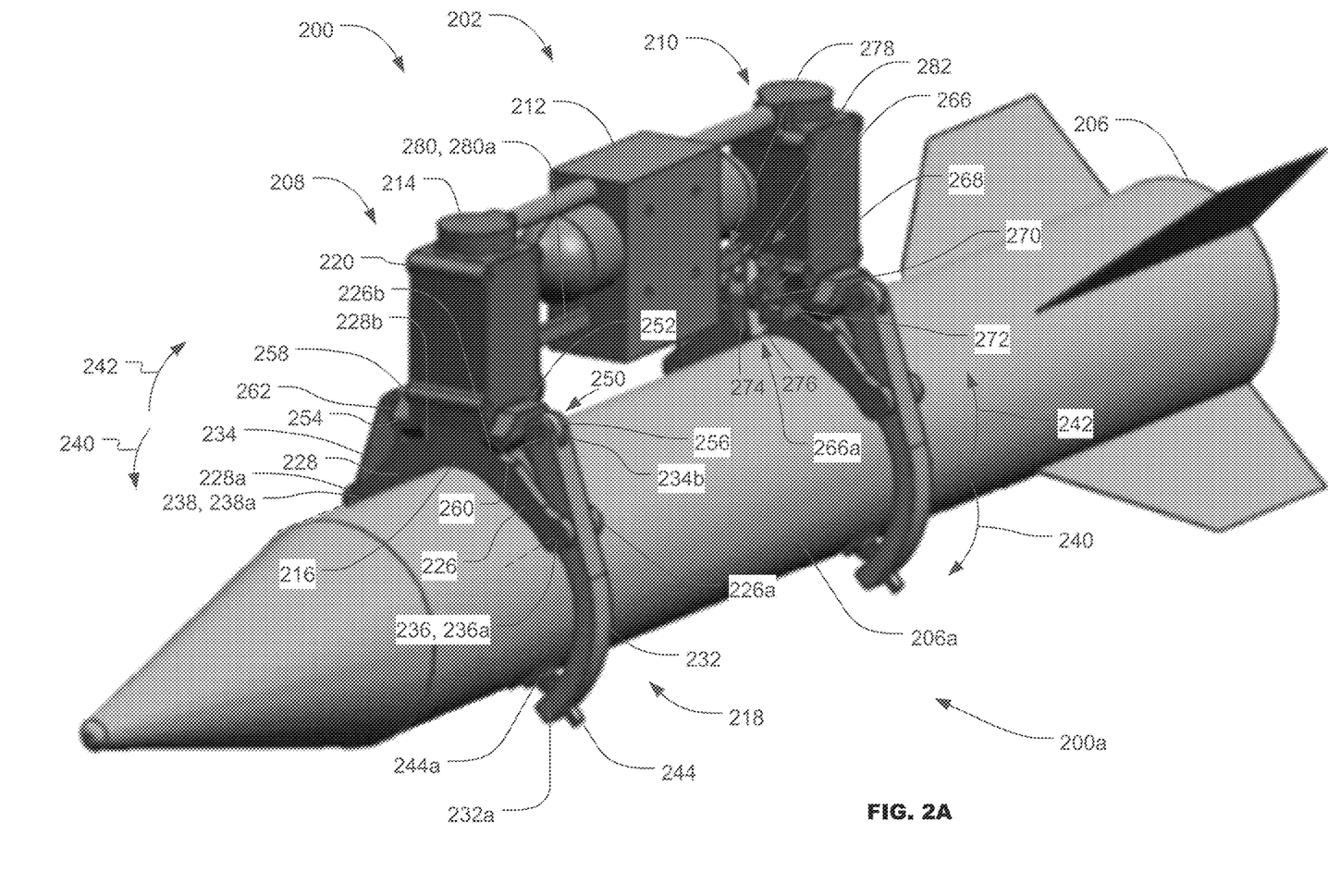
FIG. 2A is a perspective view of a first side of an example container retention and release apparatus constructed in accordance with teachings of this disclosure.
Figure 2B:
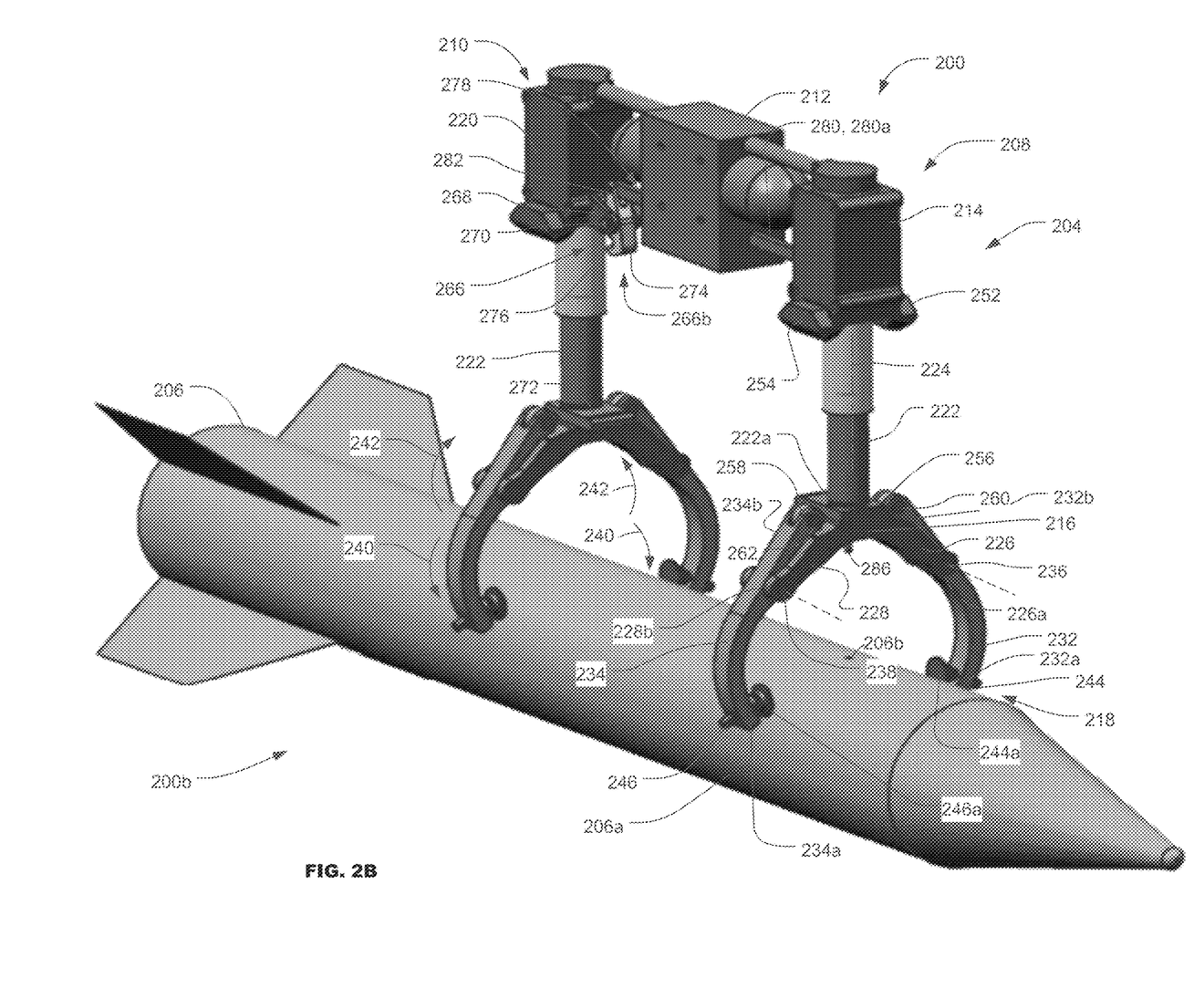
FIG. 2B is a perspective view of a second side of an example container retention and release apparatus of FIG. 2A.

FIGS. 2A and 2B are perspective views of an example container retention and release apparatus 200 disclosed herein. FIG. 2A is a perspective view of a first side 200a of the example container retention and release apparatus 200. FIG. 2A illustrates the container retention and release apparatus 200 in an example stored position 202 to retain a container 206. FIG. 2B is a perspective view of a second side 200b of the container retention and release apparatus 200. FIG. 2B illustrates the container retention and release apparatus 200 in an example deployed position 204. The aircraft 100a of FIG. 1A and the aircraft 100b of FIG. 1B can implement the example container retention and release apparatus 200 disclosed herein.

The example container retention and release apparatus 200 retains the container 206 in the stored position 202 and releases the container 206 in deployed position 204. The container 206 is a store or weapon (e.g., the container 102 of FIG. 1). The container 206 has a cylindrical shape. An outer surface 206a of the container 206 has a smooth profile and does not include lugs, fasteners, receptacles or other attachment points that can otherwise affect an aerodynamic characteristic (e.g., performance) of the container 206 when the container 206 is released from the container retention and release apparatus 200.

To move the container retention and release apparatus 200 between the stored position 202 (e.g., shown in FIG. 2A) and the deployed position 204 (e.g., shown in FIG. 2B), the container retention and release apparatus 200 includes a first ejector assembly 208, a second ejector assembly 210, and an energy source 212. The energy source 212 can be a pneumatic energy source, a hydraulic energy source, a pyrotechnic energy source and/or any other energy source to provide energy to actuate the first ejector assembly 208 and the second ejector assembly 210. The first ejector assembly 208 and the second ejector assembly 210 move together (e.g., synchronously) upon activation of the energy source 212 to release the container 206. The second ejector assembly 210 is identical (e.g., a mirror image) in both structure and function to the first ejector assembly 208. For brevity and clarity, the first ejector assembly 208 will be discussed in conjunction with the second ejector assembly 210. Each of the first ejector assembly 208 and the second ejector assembly 210 retains and releases the container 206.

To retain and/or release the container 206, the first ejector assembly 208 includes an actuator 214, a swaybrace 216 and clamp 218 (e.g., a retention device, a claw, a retainer, etc.). Specifically, the swaybrace 216 is coupled (e.g., fixed relative) to the actuator 214, and the clamp 218 is pivotally coupled to the actuator 214. The actuator 214 includes a cylinder 220 and a piston 222 (FIG. 2B) movably (e.g., slidably) coupled relative to the cylinder 220. The piston 222 moves relative to the cylinder 220 in a rectilinear direction along a longitudinal axis 224 (FIG. 2B) of the piston 222.

The swaybrace 216 is coupled to a first end 222a (FIG. 2B) of the piston 222. For example, the swaybrace 216 can be integrally formed with the piston 222 or coupled to the piston 222 via welding, a fastener (e.g., a screw, a pin, etc.) and/or otherwise fastened or connected to the piston 222. The swaybrace 216 includes a first leg 226 and a second leg 228. The first leg 226 includes a first end 226a and a second end 226b and the second leg 228 includes a first end 228a and a second end 228b. The swaybrace 216 is a unitary structure defining the first leg 226 and the second leg 228. However, in some examples, the swaybrace 216 can be multiple structures (e.g., a two-piece structure) defining the first leg 226 and the second leg 228. The first end 226a of the first leg 226 and the first end 228a of the second leg 228 extend in a direction away from the piston 222 and away from the longitudinal axis 224 of the piston 222. Thus, the first leg 226 and the second leg 228 flare from the first end 222a of the piston 222.

The clamp 218 is pivotally coupled to the piston 222 via the swaybrace 216. The clamp 218 has a first arm 232 and a second arm 234 (e.g., a clam shell or claw configuration). The first arm 232 has a first end 232a and a second end 232b, and the second arm 234 has a first end 234a and a second end 234b. The first arm 232 is pivotally coupled to the first leg 226 via a first pivot 236 and the second arm 234 is pivotally coupled to the second leg 228 via a second pivot 238 spaced from the first pivot 236. Specifically, the first pivot 236 is located adjacent (e.g., at) the first end 226a of the first leg 226 and between the first end 232a and the second end 232b of the first arm 232. For example, the first pivot 236 is located adjacent a midpoint of a length of the first arm 232. Similarly, the second pivot 238 is located adjacent (e.g., at) the first end 228a of the second leg 228 and between the first end 234a and the second end 234b of the second arm 234. For example, the second pivot 238 is located adjacent a midpoint of a length of the second arm 234. To pivotally receive the first arm 232, the first end 226a of the first leg 226 includes a yoke or clevis end and a fastener 236a (e.g., a pin) pivotally couples the first arm 232 and the first leg 226. Similarly, to pivotally receive the second arm 234, the first end 228a of the second leg 228 includes a yoke or clevis end and a fastener 238a (e.g., a pin) pivotally couples the second arm 234 and the second leg 228. The first and second arms 232, 234 have arcuate or curved shapes. For example, a portion of the first and second arms 232, 234 has a curved shape between the respective pivots 236, 238 and the respective first ends 232a, 234a, and a portion of the first and second arms 232, 234 has a straight (e.g., a linear) shape between the respective pivots 236, 238 and the second ends 232b, 234b.

The first arm 232 and the second arm 234 rotate about their respective pivots 236, 238 and move in a first direction 240 (e.g., a first rotational direction away from the piston 222 or in downward direction in the orientation of FIGS. 2A and 2B) to retain the container 206, and rotate about their respective pivots 236, 238 in a second direction 242 (e.g., a second rotational direction toward the piston 222 or in an upward direction in the orientation of FIGS. 2A and 2B) opposite the first direction 240 to release the container 206. The first arm 232 is not fixed to the second arm 234. Thus, the first arm 232 can pivot independently from the second arm 234. For example, the first arm 232 rotates in a counterclockwise direction in the orientation of FIG. 2A when the first arm 232 rotates in the first direction 240 about the pivot 236 and the second arm 234 rotates in a clockwise direction in the orientation of FIG. 2A when the second arm 234 rotates in the first direction 240 about the pivot 236. For example, the first arm 232 rotates in a clockwise direction in the orientation of FIG. 2A when the first arm 232 rotates in the second direction 242 about the pivot 236 and the second arm 234 rotates in a counterclockwise direction in the orientation of FIG. 2A when the second arm 234 rotates in the second direction 242 about the pivot 236.

To retain the container 206, the first end 232a of the first arm 232 includes a first retainer 244 and the first end 234a of the second arm 234 includes a second retainer 246. The first retainer 244 is coupled (e.g., threadably coupled) to the second end 234b of the first arm 232 and the second retainer 246 is coupled (e.g., threadably coupled) to the second end 234b of the second arm 234. To engage (e.g., brace against) an outer surface 206a of the container 206, the first retainer 244 includes a first pad 244a and the second retainer 246 includes a second pad 246a.

To restrict or prevent pivotal movement of the clamp 218 when the container retention and release apparatus 200 is in the stored position 202, the container retention and release apparatus 200 includes a lock 250. The lock 250 prevents pivotal movement of the first arm 232 and the second arm 234 in the second direction 242 (e.g., in the direction toward the piston 222) when the container retention and release apparatus 200 is in the stored position 202. The lock 250 is carried by the cylinder 220 and includes a first flange 252 located on a first side of the cylinder 220 and adjacent the second end 232b of the first arm 232 and a second flange 254 located on and a second side of the cylinder 220 opposite the first side and adjacent the second end 234b of the second arm 234. The second end 232b of the first arm 232 engages the first flange 252 (e.g., via interference) and the second end 234b of the second arm 234 engages the second flange 254 (e.g., via interference) to prevent pivotal movement of the first and second arms 232, 234 about the respective pivots 236, 238 in the second direction 242 when the container retention and release apparatus 200 is in the stored position 202.

To reduce wear to the first flange 252 and/or the second end 232b of the first arm 232, the second arm 234 includes a first guard 256. Likewise, to reduce wear to the second flange 254 and/or the second end 234b of the second arm 234, the second arm 234 includes a second guard 258. The first guard 256 is removably coupled to the second end 232b of the first arm 232 and the second guard 258 is removably coupled to the second end 234b of the second arm 234. The first guard 256 is a first roller rotatably coupled to the second end 232b of the first arm 232 via a first pin or spindle 260 and the second guard 258 is a second roller rotatably coupled to the second end 234b of the second arm 234 via a second pin or spindle 262. Each of the first and second ends 232b, 234b has a clevis or yoke shaped end to receive the respective first and second guards 256, 258. In some examples, the first guard 256 and/or the second guard 258 can be a friction pad, a bumper, and/or any other guard that can reduce or eliminate friction between the second ends 232b, 234b and the respective first and second flanges 252, 254.

To restrict or prevent movement of the piston 222 relative to the cylinder 220 when the container retention and release apparatus 200 is in the stored position 202, the container retention and release apparatus 200 includes a latch 266. The latch 266 is movable between a first or latched position 266a (FIG. 2A) to secure the piston 222 and a second or unlatched position 266b (FIG. 2B) to release the piston 222. For example, the latch 266 is coupled to the cylinder 220 via a bracket 268 formed with the cylinder 220. The latch 266 is pivotally coupled to the bracket 268 via a pin 270. To engage or couple to the piston 222, the latch 266 engages or interfaces with a locking flange 272 formed adjacent the first end 222a of the piston 222. Specifically, the swaybrace 216 includes the locking flange 272. For example, the locking flange 272 is integrally formed with the swaybrace 216. The latch 266 includes a body 274 having a hook 276 at a first end of the body 274 that removably couples or engages to the locking flange 272 of the piston 222. To move the latch 266 between the latched position 266a and the unlatched position 266b, the container retention and release apparatus 200 includes a drive system 278. For example, the drive system 278 includes a transmission 280 that operatively couples to a second end of the body 274. For example, the second end is a yoke or clevis end to receive a link 280a (e.g., a bar) of the transmission 280. A pin 282 pivotally couples the second end of the body 274 to the link 280a. The drive system 278 includes a drive (e.g., a motor, an actuator, etc.) to move or toggle the latch 266 about the pin 270 between the latched position 266a to engage the locking flange 272 and the unlatched position 266b to release the locking flange 272.

To provide an alignment guide during loading of the container 206, the container retention and release apparatus 200 includes an alignment pin 286. The alignment pin 286 engages a receptacle 206b of the container 206. In some examples, the receptacle 206b can include a spring loaded door that closes when the container retention and release apparatus 200 releases the container 206. In some examples, the door becomes flush with the outer surface 206a of the container 206 when the container retention and release apparatus 200 releases the container 206.

As noted above, the second ejector assembly 210 is identical to the first ejector assembly 208. The second ejector assembly 210 includes a cylinder 220 (e.g., a second cylinder), a piston 222 (e.g., a second piston), a swaybrace 216 that includes a first leg 226 (e.g., a third leg) and a second leg 228 (e.g., a fourth leg), a clamp 218 having a first arm 232 pivotally coupled to the first leg 226 and a second arm 234 pivotally coupled to the second leg 228, a first retainer 244 (e.g., a third retainer), a first pad 244a (e.g., a third pad), a second retainer 246 (e.g., a fourth retainer), and a second pad 246a (e.g., a fourth pad). The first ejector assembly 208 and the second ejector assembly 210 operate together to move the container 206 between the stored position 202 and the deployed position 204.

Figure 3:
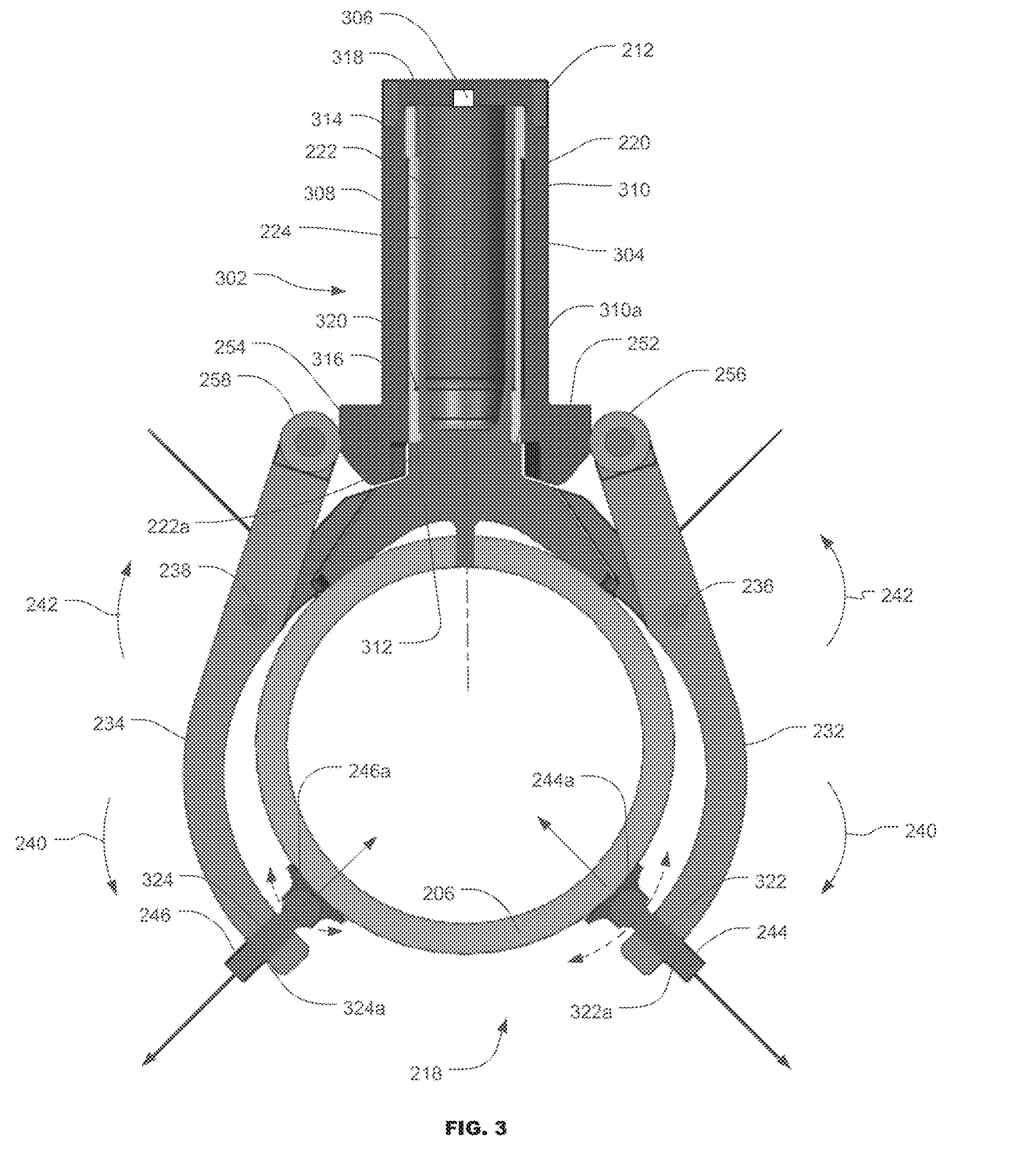
FIG. 3 is a cross-sectional view of the example container retention and release apparatus of FIG. 2A.

FIG. 3 is a front, cross-sectional view of the container retention and release apparatus 200 of FIGS. 2A and 2B. The cylinder 220 defines a cavity 304 to receive (e.g., at least a portion of) the piston 222. The cylinder 220 includes a port 306 to receive energy (e.g., pneumatic air, hydraulic oil, etc.) from the energy source 212. The energy (e.g., pressurized fluid) imparts a force on the piston 222 to cause the piston 222 to extend from the cylinder 220. The piston 222 includes a first or inner portion 308 (e.g., including a piston head) and a second or outer portion 310 (e.g., a sleeve). Specifically, the inner portion 308 is slidably coupled to the outer portion 310, and the inner portion 308 and the outer portion 310 are slidably coupled to the cylinder 220. For example, the inner portion 308 is nested with the outer portion 310 when the piston 222 is in a first stroke position 302 as shown, for example, in FIG. 3. Specifically, the inner portion 308 of the piston 222 includes a first shoulder 312 (e.g., formed via an annular recess on an outer surface of the inner portion 308) that is to engage a first end 310a of the outer portion 310 to restrict movement of the outer portion 310 relative to the inner portion 308 when the piston 222 is in the stored position 202 (e.g., the latch 266 is in the latched position 266a). When the piston 222 extends from the cylinder 220, the outer portion 310 slides relative to the cylinder 220 (with the inner portion 308 nested with the outer portion 310). Specifically, the outer portion 310 moves relative to the cylinder 220 until a second shoulder 314 of the outer portion 310 engages a third shoulder 316 of the cylinder 220. Engagement between a second shoulder 314 of the outer portion 310 and a third shoulder 316 of the cylinder 220 causes the inner portion 308 to move relative to the outer portion 310. The inner portion 308 moves relative to the outer portion 310 in a direction away from the cylinder 220 until a fourth shoulder 318 of the inner portion 308 engages a fifth shoulder 320 of the outer portion 310. Thus, the piston 222 moves to an end of stroke position when the second shoulder 314 engages the third shoulder 316 (e.g., the outer portion 310 is in a fully extended position relative to the cylinder 220) and the fourth shoulder 318 engages the fifth shoulder 320 (e.g., the inner portion 308 is in a fully extended position relative to the outer portion 310).

The first retainer 244 is oriented toward the second retainer 246. For example, the first pad 244a protrudes from the second end 232b of the first arm 232 and the second pad 246a protrudes from the second end 234b of the second arm 234 in directions toward the piston 222 and the longitudinal axis 224. The first retainer 244 is coupled to a first shaft 322 and the second retainer 246 is coupled to a second shaft 324. The first shaft 322 has a longitudinal axis 322a and the second shaft 324 has a second longitudinal axis 324a. The first and second longitudinal axes 322a, 324a are angled or canted (e.g., non-parallel) relative to the longitudinal axis 224 of the piston 222. For example, the first and second longitudinal axes 322a, 322b of the respective first and second retainers 244, 246 are at an angle of between approximately 25 degrees and 85 degrees relative to the longitudinal axis 224. Additionally, the first pad 244a is pivotally coupled to the first shaft 322 of the first retainer 244 and can pivot (e.g., swivel) about the first shaft 322. Similarly, the second pad 246a is pivotally coupled to the second shaft 324 of the second retainer 246 and can pivot (e.g., swivel) about the second shaft 324. For example, the first pad 244a and the second pad 244b are coupled to their respective shafts 322, 324 via a ball-and-socket connection.

To adjust (e.g., increase or decrease) a force or preload (e.g., a clamping force) to be applied to the container 206, the first retainer 244 is adjustably coupled to the first arm 232 and the second retainer 246 is adjustably coupled to the second arm 234. The first retainer 244 is adjustable relative to the first arm 232 in a direction along the first longitudinal axis 322a of the first shaft 322 and the second retainer 246 is adjustable relative to the second arm 234 in a direction along the second longitudinal axis 324a of the second shaft 324. For example, each of the first shaft 322 and the second shaft 324 is threadably coupled to the respective first and second arms 232, 234. The first pad 244a can be adjusted independently from the second pad 246a. To adjust the first pad 244a relative to the container 206, the first shaft 322 is rotated about the first longitudinal axis 322a. To adjust the second pad 246a relative to the container 206, the second shaft 324 is rotated about the second longitudinal axis 324a. For example, to receive a tool, the first and second shafts 322, 324 can include hex-shaped ends.

For example, to facilitate loading of the container 206 and the clamp 218, the first retainer 244 and the second retainer 246 can be adjusted to (e.g., fully) retracted positions so that the first pad 244a is adjacent (e.g., in engagement with) the first arm 232 and the second pad 246a is adjacent (e.g., in engagement with) the second arm 234. The container 206 can be positioned between the first and second arms 232, 234 without interference between the second ends 232b, 234b with the respective flanges 252, 254. The first and second arms 232, 234 pivot toward the second direction 242. After the container 206 is positioned between the first and second arms 232, 234, the first pad 244a and the second pad 246a can be adjusted to engage the container 206. To cause the second ends 232b, 234b to engage the respective flanges 252, 254, the first and second retainers 244, 246 are adjusted to cause the first ends 232a, 234a of the first and second arms 232, 234 to move in a direction away from the first and second pads 244a, 246a. Engagement of the first and second pads 244a and 246a and the outer surface 206a and further adjustment of the first pad 244a and the second pad 246a toward the container 206 causes the respective first and second arms 232, 234 to rotate about their respective pivots 236, 238 in the second direction 242 so that the second ends 232b, 234b engage the respective flanges 252, 254. In turn, the respective flanges 252, 254 impart reactive forces that bias the respective first and second arms 232, 234 in the first direction 240.

Figure 4:
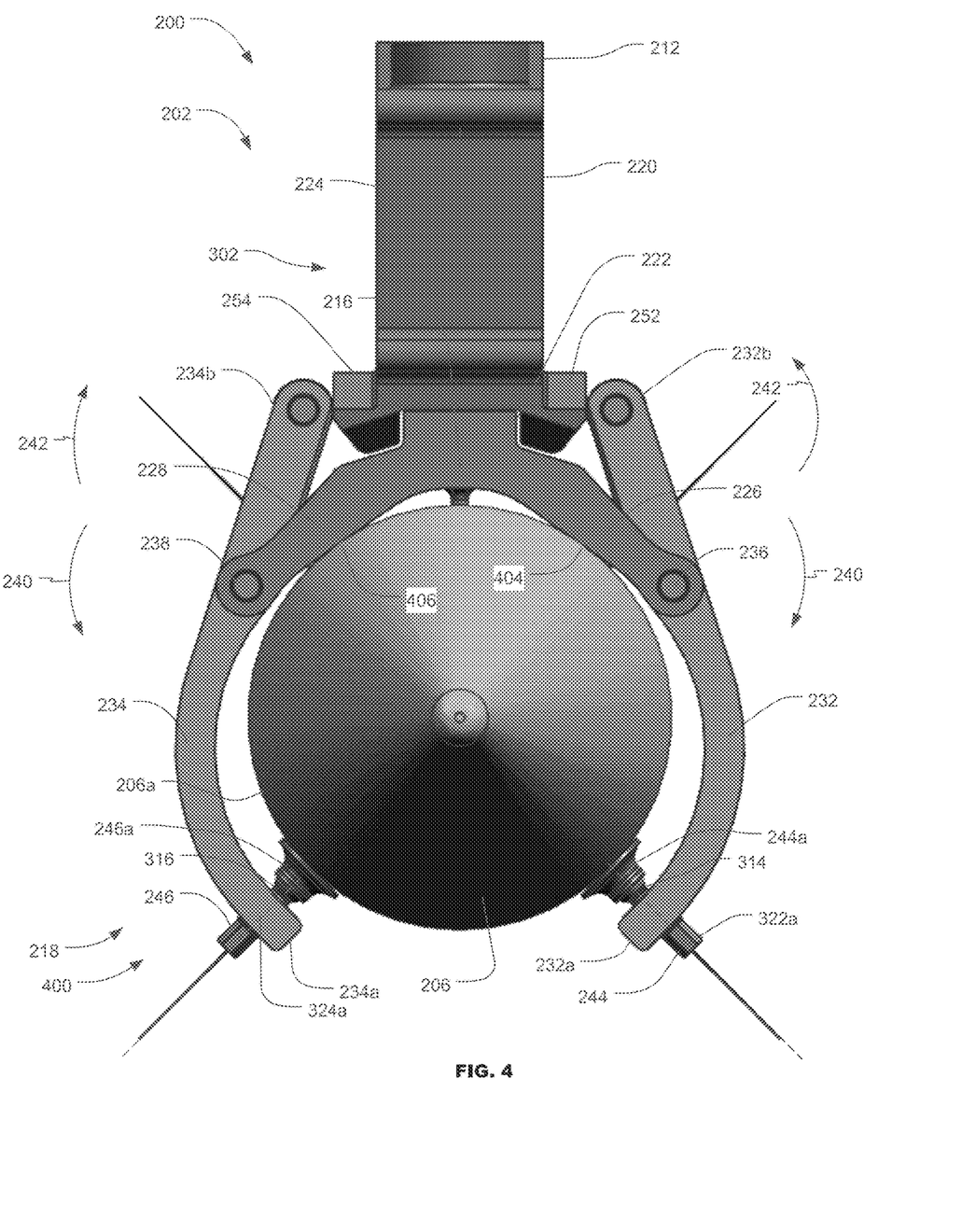
FIG. 4 is a front view of the example container retention and release apparatus of FIGS. 2A and 2B shown in an example stored position.

FIG. 4 is a front view of the container retention and release apparatus 200 of FIG. 2A showing the container and release apparatus 200 in the stored position 202 and the clamp 218 in a clamping position 400. In the stored position 202, the piston 222 is in a first stroke position 302 and the latch 266 (FIG. 2A) is in the latched position 266a. For example, the hook 276 (FIG. 2A) is engaged with the locking flange 272 of the piston 222 to prevent the inner portion 308 and the outer portion 310 from moving relative to the cylinder 220.

The swaybrace 216 and the clamp 218 provide a clamping force and/or holding force to retain the container 206 coupled to the container retention and release apparatus 200. For example, the interaction between the first and second retainers 244, 246 and the container 206, and the interaction between the second ends 232b, 234b of the first and second arms 232, 234 and the respective first and second flanges 252, 254 (e.g., the lock 250) generate the clamping and holding force. For example, the second ends 232b, 234b of the first and second arms 232, 234 engage the respective first and second flanges 252, 254 of the cylinder 220 to prevent or restrict rotation of the first and second arms 232, 234 about the respective pivots 236, 238 in the first direction 240. Thus, the first flange 252 exerts a reactive force to the second end 232b in a direction away from the first flange 252 to cause the first arm 232 to rotate about the first pivot 236 in the first direction 240 and the second flange 254 exerts a reactive forces to the second end 234b in a direction away from the second flange 254 to cause the second arm 234 to rotate about the second pivot 238 in the first direction 240. Also, the engagement between the first pad 244a and the container 206 causes the container 206 to exert a reactive force to bias the first arm 232 to pivot about the first pivot 236 in the second direction 242, and the engagement between the second pad 246a and the container 206 causes the container 206 to exert a reactive force to bias the second arm 234 to pivot about the second pivot 238 in the second direction 242. To this end, engagement between the first flange 252 and the second end 232b of the first arm 232 prevents rotation of the first arm 232 about the first pivot 236 in the first direction 240 and the second direction 242. Likewise, the engagement between the second flange 254 and the second end 234b of the second arm 234 and the engagement between the second pad 246a with the container 206 prevents rotation of the second arm 234 about the second pivot 238 in the first direction 240 and the second direction 242. Additionally, a first portion 404 of the first leg 226 and a first portion 406 of the second leg 228 engage the outer surface 206a of the container 206. Thus, the container 206 is entrapped by the clamp 218 and the swaybrace 216. As noted above, the clamping force can be adjusted by adjusting the first retainer 244 about the first longitudinal axis 322a and/or the second retainer 246 about the second longitudinal axis 324a.

Figure 5:
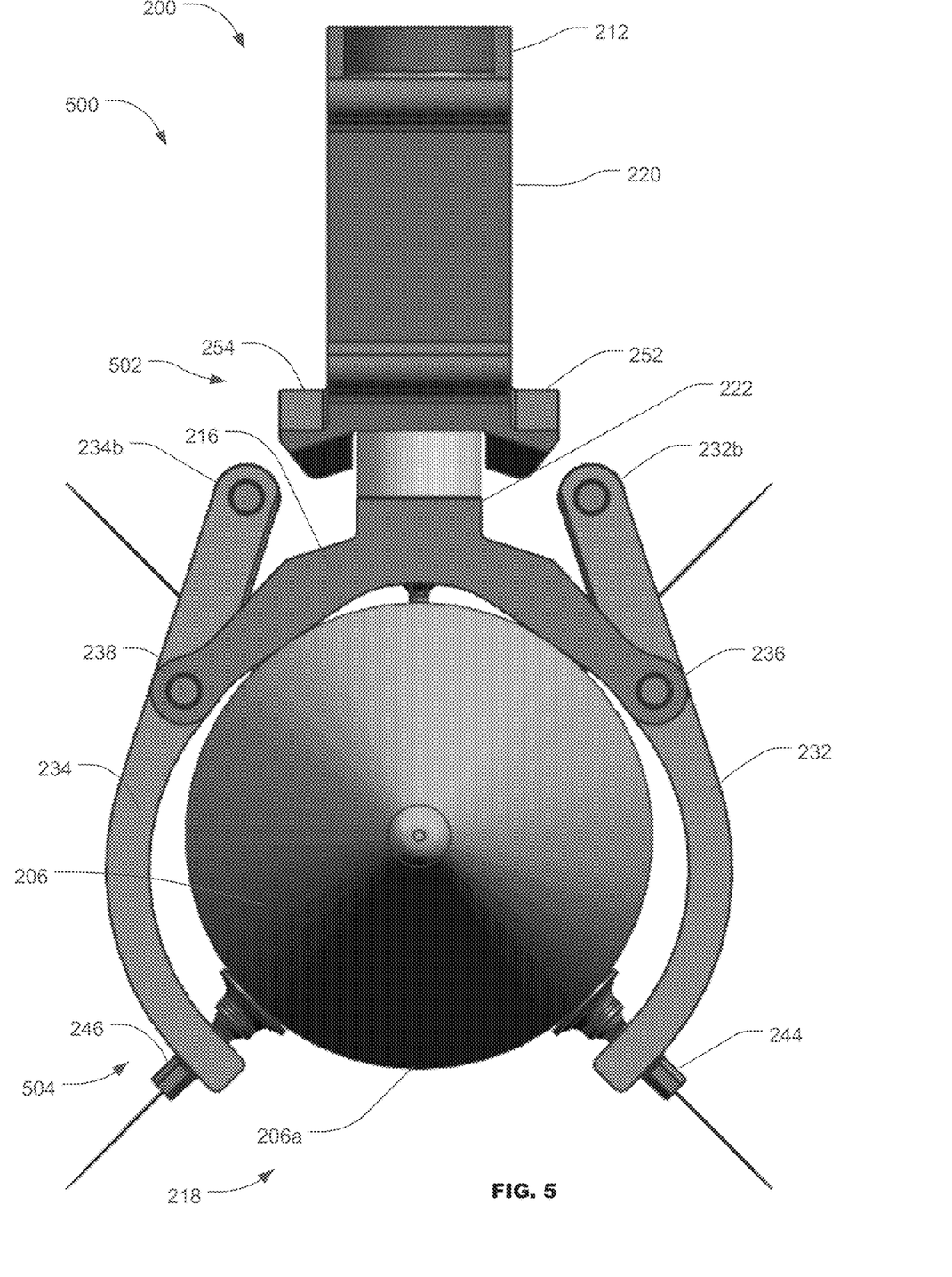
FIG. 5 is a front view of the example container retention and release apparatus of FIGS. 2A and 2B shown in an intermediate deployed position.

FIG. 5 is a front view similar to FIG. 4 but showing the container retention and release apparatus 200 in an intermediate position 500 (e.g., an ejection stroke 502 between the stored position 202 and the deployed position 204). To move the container retention and release apparatus 200 to the deployed position 204, the drive system 278 (FIGS. 2A and 2B) disengages or releases the latch 266 from the piston 222. Specifically, the latch 266 moves to the unlatched position 266b shown in FIG. 2B. The energy source 212 causes the piston 222 to extend from the cylinder 220. During extension of the piston 222 from the cylinder 220, the clamp 218 (e.g., the first arm 232 and the second arm 234) can rotate freely. For example, the second ends 232b, 234b of the first and second arms 232, 234 move away (e.g., in a downward direction in the orientation of FIG. 5) from the first and second flanges 252, 254, respectively. However, ejection forces generated by the energy source 212 maintain the swaybrace 216 in an intermediate position 504. In the intermediate position 504, the first and second retainers 244, 246 may or may not remain engaged with the outer surface 206a of the container 206 depending on forces acting on the first and second arms 232 and 234 (e.g. ejection forces, and aerodynamic forces and accelerations of the aircraft). In other examples, springs can be employed to maintain the first and second pads 244a, 246a in contact with the outer surface 206a of the container 206. When the clamp 218 is in the intermediate position 504, the first and second arms 232 and 234 are no longer in engagement with the respective first and second flanges 252, 254.

Figure 6:
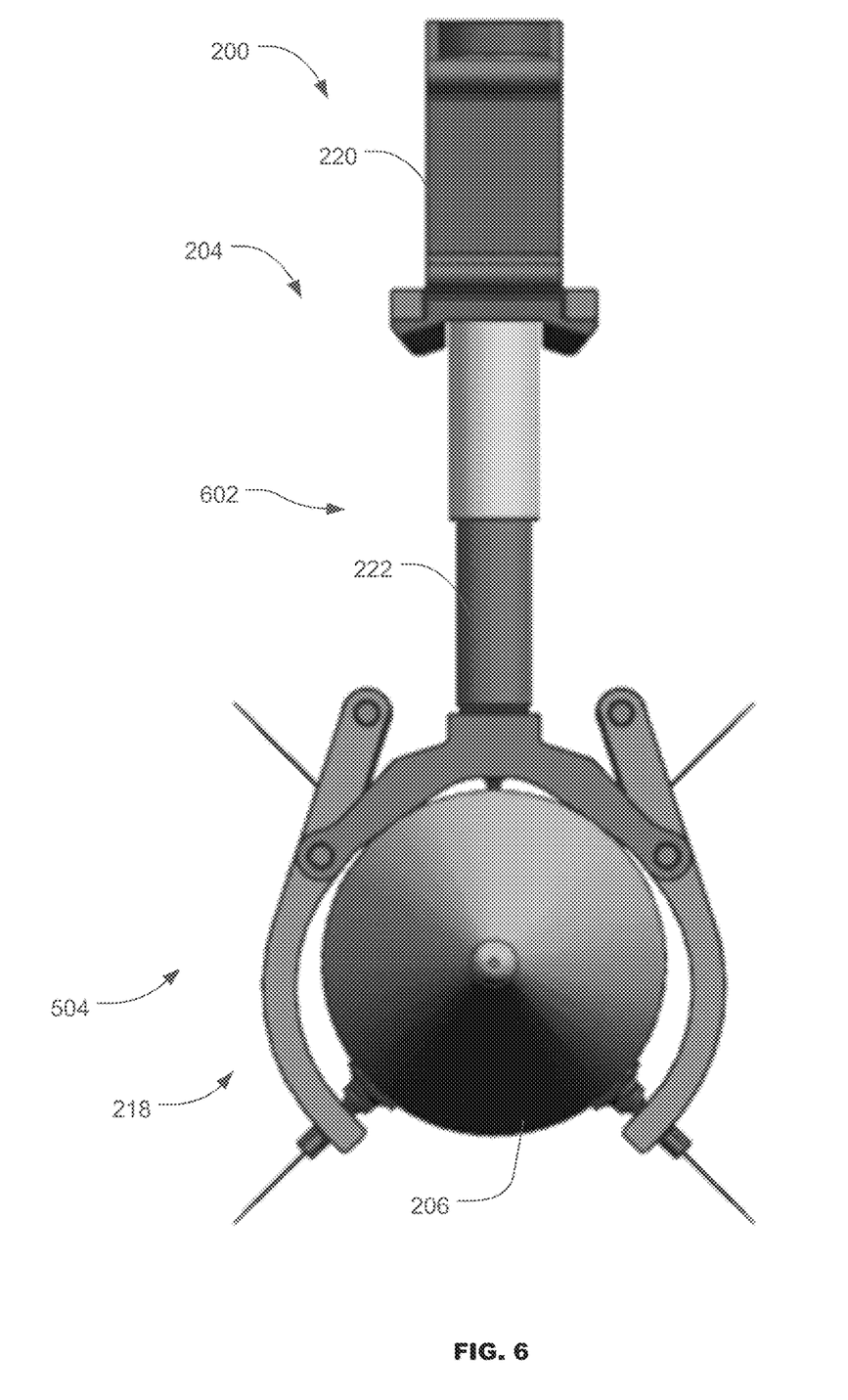
FIG. 6 is a front view of the example container retention and release apparatus of FIGS. 2A and 2B shown in the example deployed position.

FIG. 6 is a front view similar to FIG. 5 but showing the container retention and release apparatus 200 in the deployed position 204. In the deployed position 204, the piston 222 moves from the first stroke position 302 to a second stroke position 602 (e.g., an end of stroke position). The piston 222 moves to the second stroke position 602 to position the container 206 away from the cylinder 220 prior to releasing the container 206 from the container retention and release apparatus 200. The clamp 218 is in the intermediate position 504.

Figure 7:
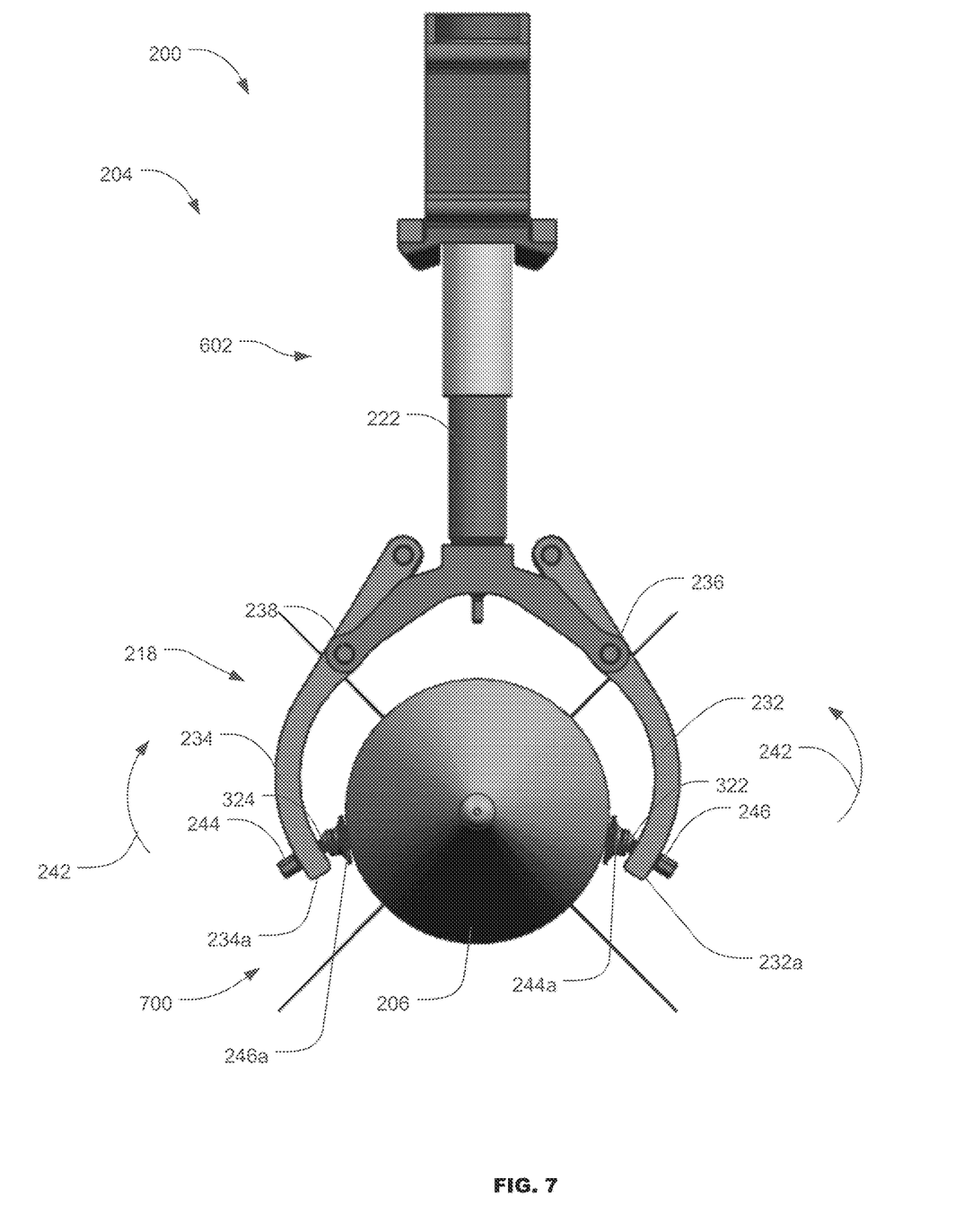
FIG. 7 is a front view of the example container retention and release apparatus of FIGS. 2A and 2B shown in an intermediate release position.

FIG. 7 is a front view similar to FIG. 6 but showing the container retention and release apparatus 200 in the deployed position 204 and the clamp 218 in an intermediate release position 700. At the second stroke position 602 (e.g., an end of stroke position), the container 206 continues to fall away from the container retention and release apparatus 200 due to inertia and gravity. In turn, inertia of the container 206 imparts forces on the clamp 218. The forces cause the first arm 232 and the second arm 234 to rotate about the respective pivots 236, 238. Specifically, the container 206 causes the first ends 232a and 234a of the first and second arms 232, 234 to rotate about the respective pivots 236, 238 in the second direction 242. Additionally, to facilitate release of the container 206, the first pad 244a swivels about the first shaft 322 and the second pad 246a swivels about the second shaft 324 due to the weight of the container 206.

Figure 8:
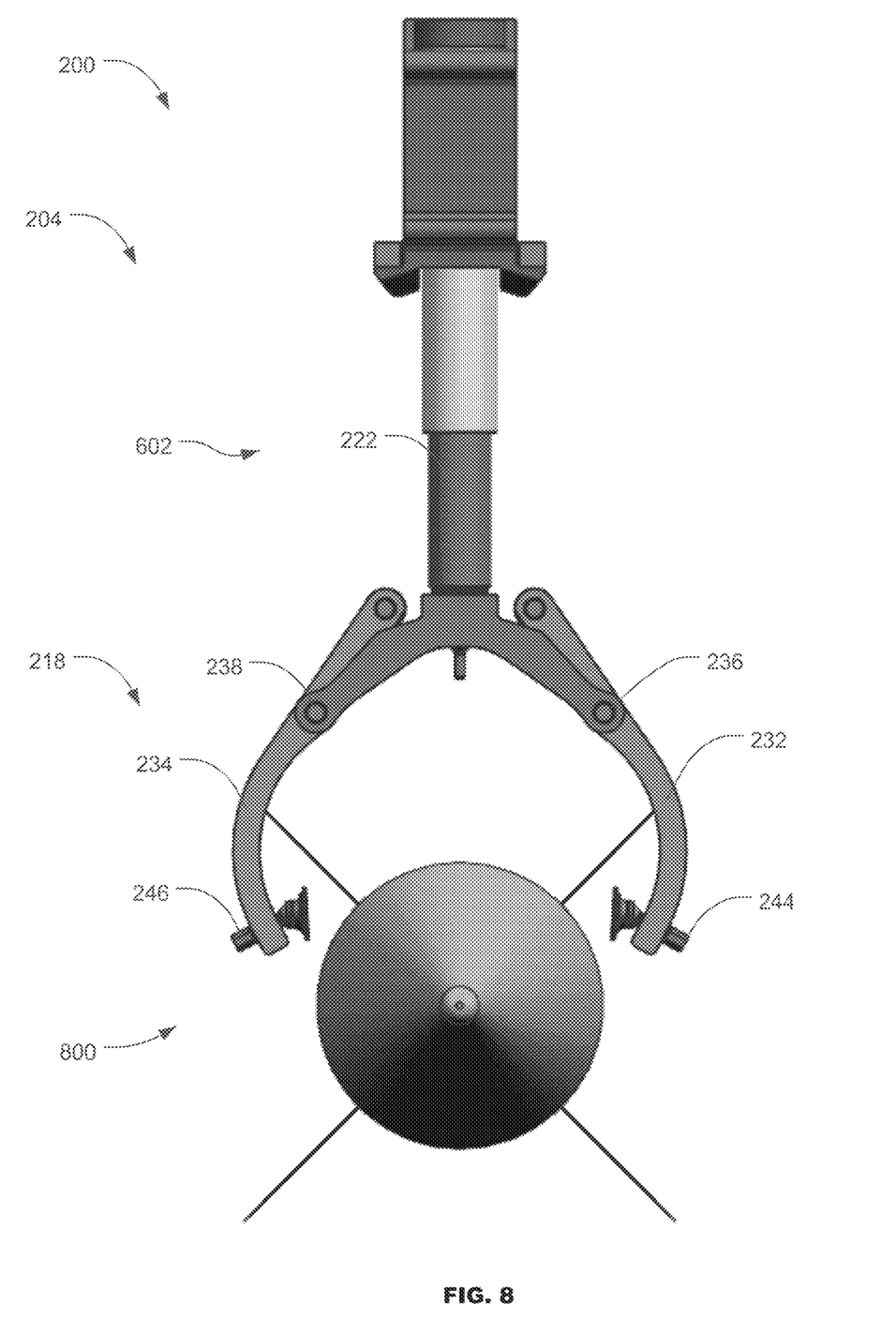
FIG. 8 is a front view of the example container retention and release apparatus of FIGS. 2A and 2B shown in an example release position.

FIG. 8 is a front view similar to FIG. 7 but showing the container retention and release apparatus 200 in the deployed position 204 and the clamp 218 in a release position 800. As the first and second arms 232, 234 rotate about the respective pivots 236, 238 in the second direction 242, the first retainer 244 and the second retainer 246 disengage the container 206, thereby releasing the container 206.

The example container retention and release apparatus 200 controls an orientation of the container 206 and/or motion thereof during an ejection event in at least the pitch axis and the yaw axis by retaining the container 206 throughout the ejection event (e.g., as the piston 222 moves from the first stroke position 302 to the second stroke position 602). In some examples, the alignment pin 286 of container retention and release apparatus 200 prevents or restricts motion of the container 206 about the roll axis. In other examples, the alignment pin 286 is omitted and the container retention and release apparatus 200 can allow the container 206 to roll in either direction about the roll axis during ejection of the container 206.

In some examples, the first ejector assembly 208 and/or the second ejector assembly 210 provides means for retaining and/or releasing a container 206. In some examples, the piston 222 provides means for moving or ejecting a container from an aircraft. In some examples, the swaybrace 216 and/or the clamp 218 provides means for clamping or holding a container. In some examples, the first pivot 236 (e.g., a fastener and/or equivalents thereof) and the second pivot 238 (e.g., a fastener and/or equivalents thereof) provide means for pivotably coupling the first arm 232 and the second arm 234 to the first end 222a of the piston 222. In some examples, the cylinder 220 provides means for defining a cavity 304. In some examples, the energy source 212 provides means for providing energy. In some examples, the first pad 244a and/or the second pad 246a provide means for engaging or retaining a container. In some examples, the latch 266 provides means for latching the piston 222. In some examples, the drive system 278 provides means for actuating the latch 266 between the latched position 266a and the unlatched position 266b. In some examples, the lock 250 provides means for preventing rotation of the clamp 218 (the first arm 232 and the second arm 234) toward the second direction 242 or a release position 800. In some examples, the first guard 256 and the second guard 258 provide means for reducing friction.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that example methods, apparatus and articles of manufacture improve container aerodynamic drag performance or characteristics by eliminating container lugs, receptacles and/or hangers. As a result, containers can have reduced store weight, increased range, and/or increased payload.

At least some of the aforementioned examples include one or more features and/or benefits including, but not limited to, the following:

In some examples, a container retention and release apparatus includes an actuator, a swaybrace coupled to the actuator, and a clamp pivotally coupled to the swaybrace. The clamp is to pivot between a clamping position to retain a container and a release position to release the container.

In some examples, the actuator includes a piston movable relative to a cylinder between a first stroke position and a second stroke position, the container retention and release apparatus being in a stored condition when the piston is at the first stroke position and a deployed condition when the piston is at the second stroke position.

In some examples, the swaybrace and the clamp provide a clamping force to retain the container.

In some examples, the clamp pivots to the release position when the piston is at the second stroke position.

In some examples, a latch movable between a latch position to prevent movement of the piston when the container retention and release apparatus is in the stored condition.

In some examples, a drive system to move the latch between a latched position to prevent movement of the piston relative to the cylinder and an unlatched position to allow movement of the piston relative to the cylinder.

In some examples, a lock to engage the clamp when the clamp is in the clamping position and the container retention and release apparatus is in the stored condition to prevent pivotal movement of the clamp in a direction away from the container.

In some examples, an energy source to cause the piston to move between the first stroke position and the second stroke position.

In some examples, a container retention and release apparatus includes a cylinder including a piston movably coupled to the cylinder, a swaybrace coupled to a first end of the piston, the swaybrace having a first leg and a second leg, and a clamp pivotally coupled to the swaybrace. The clamp includes a first arm pivotally coupled to the first leg of the swaybrace via a first pivot; and a second arm pivotally coupled to the second leg of the swaybrace via a second pivot, the first arm and the second arm to pivot in a first direction about the respective first and second pivots to retain the container, and the first arm and the second arm to pivot in a second direction opposite the first direction to release the container.

In some examples, a first end of the first arm includes a first retainer having a first pad and a first end of the second arm includes a second retainer having a second pad, the first and second pads to engage with an outer surface of the container when the clamp retains the container.

In some examples, the first pad is adjustable relative to the first arm and the second pad is adjustable relative to the second arm.

In some examples, the first pad is pivotally coupled to a first shaft of the first retainer and the second pad is pivotally coupled to a second shaft of the second retainer, the first pad to swivel relative to the first shaft and the second pad to swivel relative to the second shaft to release the container.

In some examples, a second end of the first arm and a second end of the second arm engage the cylinder when the clamp is in a clamping position.

In some examples, each of the second ends of the first arm and the second arm includes a roller.

In some examples, the clamp provides a clamping force based on an interaction between the first ends of the respective first and second arms and the outer surface of the container and between the second ends of the respective first and second arms and the cylinder.

In some examples, the swaybrace and the clamp capture the container when the container retention and release apparatus is in a stored position.

In some examples, each of the first arm and the second arm has a curved shape.

In some examples, the first pivot is located adjacent a first end of the first leg of the swaybrace and between a first end and a second end of the first arm, and the second pivot is located adjacent a second end of the second leg of the swaybrace and between a first end and a second end of the second arm.

In some examples, a method includes: moving an actuator between a first stroke position and a second stroke position, the actuator supporting a swaybrace; retaining the container by pivoting a first arm of a clamp relative to a first leg of the swaybrace and pivoting a second arm of the clamp relative to a second leg of the swaybrace in a first direction when the actuator is in the first stroke position; and releasing the container by pivoting the first arm relative to a first leg and pivoting the second arm relative to the second leg in a second direction opposite the first direction when the actuator is in the second stroke position.

In some examples, the method includes restricting movement of the actuator and pivotal movement of the first and second arms when the actuator is at the first stroke position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A container retention and release apparatus comprising:
   an actuator;
   a swaybrace coupled to the actuator, the swaybrace including a first leg and a second leg extending from the actuator; and
   a clamp pivotally coupled to the swaybrace, the clamp to pivot between a clamping position to retain a container and a release position to release the container, the clamp including:
   a first arm pivotally coupled to the first leg of the swaybrace about a first pivot, the first arm having a first end and a second end opposite the first end; and
   a second arm pivotally coupled to the second leg of the swaybrace about a second pivot, the second arm having a third end and a fourth end opposite the third end to engage the actuator, wherein to retain the container:
   at least portions of the first leg and the second leg are to engage the container;
   the first end of the first arm is to engage the container and the second end is to engage the actuator; and
   the third end of the second arm is to engage the container and the fourth end is to engage the actuator.

2. The apparatus of claim 1, wherein the actuator includes a piston movable relative to a cylinder between a first stroke position and a second stroke position, the container retention and release apparatus being in a stored condition when the piston is at the first stroke position and a deployed condition when the piston is at the second stroke position.

3. The apparatus of claim 2, wherein the first leg and the second leg of the swaybrace and the first arm and the second arm of the clamp engage the container at different points to provide a clamping force to retain the container.

4. The apparatus of claim 3, wherein the clamp pivots to the release position when the piston is at the second stroke position.

5. The apparatus of claim 2, further including a latch move to prevent movement of the piston when the container retention and release apparatus is in the stored condition.

6. The apparatus of claim 5, further including a drive system to move the latch between a latched position to prevent movement of the piston relative to the cylinder and an unlatched position to allow movement of the piston relative to the cylinder.

7. The apparatus of claim 2, further including a lock to engage the clamp when the clamp is in the clamping position and the container retention and release apparatus is in the stored condition to prevent pivotal movement of the clamp in a first direction away from the container.

8. The apparatus of claim 2, further including an energy source to cause the piston to move between the first stroke position and the second stroke position.

9. A container retention and release apparatus comprising:
   a cylinder including a piston movably coupled to the cylinder;
   a swaybrace coupled to a first end of the piston, the swaybrace having a first leg and a second leg; and
   a clamp pivotally coupled to the swaybrace, the clamp including:
   a first arm pivotally coupled to the first leg of the swaybrace via a first pivot, the first arm including a first end to engage the container and a second end opposite the first end to engage the cylinder; and
   a second arm pivotally coupled to the second leg of the swaybrace via a second pivot, the second arm including a first end to engage the container and a second end opposite the first end to engage the cylinder, the first arm and the second arm to pivot in a first direction about the respective first and second pivots to retain the container, and the first arm and the second arm to pivot in a second direction opposite the first direction to release the container, the clamp to generate a clamping force to restrict rotation of the first and second arms about the respective first and second pivots based on an interaction between: the first ends of the respective first and second arms and an outer surface of the container; the second ends of the respective first and second arms and the cylinder; and the first and second legs and the outer surface of the container.

10. The apparatus of claim 9, wherein the first end of the first arm includes a first retainer having a first pad and the first end of the second arm includes a second retainer having a second pad, the first and second pads to engage with the outer surface of the container when the clamp retains the container.

11. The apparatus of claim 10, wherein the first pad is adjustable relative to the first arm and the second pad is adjustable relative to the second arm.

12. The apparatus of claim 10, wherein the first pad is pivotally coupled to a first shaft of the first retainer and the second pad is pivotally coupled to a second shaft of the second retainer, the first pad to swivel relative to the first shaft and the second pad to swivel relative to the second shaft to release the container.

13. The apparatus of claim 10, wherein the second end of the first arm and the second end of the second arm engage the cylinder when the clamp is in a clamping position.

14. The apparatus of claim 13, wherein each of the second ends of the first arm and the second arm includes a roller.

15. The apparatus of claim 9, wherein the swaybrace and the clamp capture the container when the container retention and release apparatus is in a stored position.

16. The apparatus of claim 9, wherein each of the first arm and the second arm has a curved shape.

17. The apparatus of claim 9, wherein the first pivot is located adjacent a first end of the first leg of the swaybrace and between the first end and the second end of the first arm, and the second pivot is located adjacent a second end of the second leg of the swaybrace and between the first end and the second end of the second arm.

18. A method including:
moving an actuator between a first stroke position and a second stroke position, the actuator supporting a swaybrace;
retaining a container by pivoting a first arm of a clamp relative to a first leg of the swaybrace and pivoting a second arm of the clamp relative to a second leg of the swaybrace in a first direction when the actuator is in the first stroke position, the first leg and the second leg of the swaybrace and the first arm and the second arm of the clamp to engage the container at different positions to entrap and retain the container; and
releasing the container by pivoting the first arm relative to the first leg and pivoting the second arm relative to the second leg in a second direction opposite the first direction in response to the actuator moving to the second stroke position.

19. The method of claim 18, further including restricting movement of the actuator and pivotal movement of the first and second arms when the actuator is at the first stroke position.

* * * * *